(12) United States Patent
Rackers et al.

(10) Patent No.: US 7,708,124 B1
(45) Date of Patent: May 4, 2010

(54) ANCHORING SLEEVE ASSEMBLY AND METHOD OF USE

(76) Inventors: Mitchell ("Mitch") Lee Rackers, 1013 Cypress Dr., Rolla, MO (US) 65401; Donald Michael Radeka, 16132 Scenic Trail, Spring Lake, MI (US) 49456; Gregory Paul Lopez, 2280 Bullard, Hartland, MI (US) 48353

( * ) Notice: Subject to any disclaimer, the term of this patent is extended or adjusted under 35 U.S.C. 154(b) by 1033 days.

(21) Appl. No.: 11/416,741

(22) Filed: May 3, 2006

Related U.S. Application Data (60) Provisional application No. 60/735,544, filed on Nov. 10, 2005.

(51) Int. Cl.
*F16D 65/14* (2006.01)

(52) U.S. Cl. ............................. 188/250 F; 188/206 A; 301/124.1

(58) Field of Classification Search .............. 188/250 F, 188/206 A, 205 R, 206 R; 301/124.1, 125, 301/131, 32
See application file for complete search history.

(56) References Cited

U.S. PATENT DOCUMENTS

| 4,080,003 | A | | 3/1978 | Boughton |
| 4,363,522 | A | | 12/1982 | Palovcik |
| 4,491,340 | A | * | 1/1985 | Von Grunberg et al. ................. 280/124.154 |
| 4,582,338 | A | * | 4/1986 | Colanzi ............... 280/124.146 |
| 4,659,005 | A | | 4/1987 | Spindler |
| 4,854,427 | A | | 8/1989 | Baroni |
| 5,301,774 | A | | 4/1994 | Cho et al. |
| 5,649,612 | A | | 7/1997 | Walker et al. |
| 6,279,695 | B1 | | 8/2001 | Davison |
| 6,398,241 | B1 | * | 6/2002 | Mahnig et al. ......... 280/93.512 |
| 6,550,869 | B2 | * | 4/2003 | Dantele ................... 301/124.1 |

\* cited by examiner

*Primary Examiner*—Pam Rodriguez
(74) *Attorney, Agent, or Firm*—Rafael V. Baca; Baca Law Firm, PLLC (57) ABSTRACT

An anchoring sleeve assembly for securing a plurality of component systems to an axle tube housing. In one aspect, the anchoring sleeve assembly is pre-machined prior to installation on the axle tube housing to reduce the need for further machining operations once coupled to the axle tube housing. In particular, the anchoring sleeve assembly includes an annular portion defining a sleeve bore and a plurality of fixation apertures positioned about the annular portion. The anchoring sleeve assembly includes a plurality of extended portions projecting outwardly from the annular portion. Each extended portion from the plurality of extended portions fixedly receives a respective component system from the plurality of component systems to ultimately secure the component system to the axle tube housing.

10 Claims, 9 Drawing Sheets

ANCHORING SLEEVE ASSEMBLY AND METHOD OF USE

CROSS REFERENCE TO RELATED APPLICATIONS

This application is related to and claims benefit under 35 U.S.C. §119(e) from prior U.S. Provisional Patent Application Ser. No. 60/735,544 filed on Nov. 10, 2005 entitled "An Anchoring Sleeve Assembly and Method of Use", by inventors M. Rackers et al., the entire disclosure of which is hereby incorporated by reference as if fully set forth herein.

BACKGROUND OF THE INVENTION

1. Field of the Invention

The present invention generally relates to an anchoring sleeve assembly for placement on an axle tube housing of a motor vehicle. More particularly, but not by way of limitation, the present invention relates to an axle system and method for securing a plurality of component systems to an axle tube housing, whereby the component systems are used for a wide variety of applications and illustratively include, among others, braking systems, sensor systems, and suspension systems.

2. Description of the Related Art

Generally, axle tube housings are steel tubes that protect a motor vehicle axle set within the housing from unwanted external factors such as, among others, weather factors such as rain, snow, dust, mud, salt, and foreign objects such as rocks or other components. In the case of a driven axle, axle tube housings facilitate continuous axle rotation without external interruptions. Specifically, an axle tube housing supports the weight of a motor vehicle as well as conveys driveline forces. Apart from protecting a motor vehicle axle, axle tube housings are often machined to accommodate many additional functions. Most of these machining operations are complicated in that they often take place after the axle is set within the axle tube housing. Typically, the inner diameter of the axle tube housing is machined to accommodate wheel bearings whereas the outer diameter is conditioned at one end for attachment of a brake system and, optionally, the other end of the housing is conditioned for insertion into a differential housing.

Illustratively, for the attachment of the brake system, a welded support plate typically of steel is initially secured onto one end of the axle tube housing through standard welding operations. Commonly, after it is secured on to the axle tube housing, the welded support plate is machined or, specifically, "faced off" to ensure that the welded support plate is aligned perpendicular to the centerline shared by both the wheel bearing and axle. Accordingly, based on this operation, the rotor is ultimately positioned relative to the brake shoes. This facing off operation adds additional costs to the overall assembly. In some instances, practical limitations in the thickness and processing of a welded support plate result in insufficient lateral stiffness. In such instances, additional structure may be added to the assembly. In instances of insufficient lateral stiffness, the operational effect of the braking system with respect to the welded support plate would increase the risk of unwanted harmonic oscillations to the welded support plate. Particularly, mechanical stiffness decreases as the thickness of the welded support plate decreases. Ultimately, in relation to a braking system attached to the welded support plate, decreased lateral stiffness of the welded support plate heightens the possibility for brake shimmy and noise to passengers operating a motor vehicle during braking related events.

After "facing off" the welded support plate, the brake adaptor plate may be secured to the welded support plate to receive component systems such as, among others, brake calipers. A drawback to this conventional attachment scheme is that the lateral stiffness of the component system is directly dependent on the thickness of the welded support plate and its interface with the axle tube housing and is dependent on a bolted joint that couples the component system to the axle tube housing. In some instances, the lateral stiffness is not sufficient for braking related events and thus causes undesirable noises and vibrations.

Unfortunately, there is no known device or method for quickly and accurately securing and positioning component systems such as a braking system to the axle tube housing without imparting structural difficulties and additional machining operations to the axle tube housing and welded support plate arrangement. Therefore, a need exists for a system and method for quick and accurate placement of component systems with respect to the positioning of the axle centerline. Many other problems and disadvantages of the prior art will become apparent to one skilled in the art after comparing such prior art with the present invention as herein described.

SUMMARY OF THE INVENTION

Aspects of the invention are found in an anchoring sleeve assembly for securing a plurality of component systems to an axle tube housing. In one aspect, the anchoring sleeve assembly is pre-machined prior to installation on the axle tube housing to reduce the need for further machining operations once coupled to the axle tube housing. The anchoring sleeve assembly enables a variety of component systems to be secured to the axle tube housing without the need for adding standard joining structures, such as, among others, bolted joints. The anchoring sleeve assembly permits a variety of component systems to be secured to the axle tube housing such as, among others, an electrical system such as, among others, electrical wiring; a brake system such as, among others, brake calipers, brake lines, parking brake cable; a sensor system such as, among others, Anti-lock Brake System (hereinafter "ABS") sensors, a suspension system such as, among others, a leaf spring assembly, a coil spring assembly, shocks and struts, stabilizer bars, track bars, and springs.

In particular, the anchoring sleeve assembly includes an annular portion. The annular portion defines a sleeve bore and a plurality of fixation apertures positioned about the annular portion. The plurality of fixation apertures are in communication with the sleeve bore. The sleeve bore is pre-machined to permit the anchoring sleeve assembly to fit over the axle tube housing. The anchoring sleeve assembly includes a plurality of extended portions projecting outwardly from the annular portion. Each extended portion from the plurality of extended portions fixedly receives a respective component system from the plurality of component systems to ultimately secure the component system to the axle tube housing. In one aspect, a component system from the plurality of component systems is aligned with the centerline defined by the axle within the axle tube housing as it is secured to a respective extended portion.

In one aspect, the sleeve bore is pre-machined to optimally permit the anchoring sleeve assembly to fit over the axle tube housing with a slight clearance to an interference fit. In one aspect, a plurality of anchoring sleeve assemblies may be secured to one axle tube housing.

In one aspect, an axle system is provided for securing a plurality of component systems. The axle system comprises an axle tube housing and an anchoring sleeve assembly. The anchoring sleeve assembly includes an annular portion defining a sleeve bore and a plurality of fixation apertures disposed about the annular portion. The plurality of fixation apertures communicate with the sleeve bore. The sleeve bore is pre-machined to permit the anchoring sleeve assembly to fit over the axle tube housing. The anchoring sleeve assembly further includes a plurality of extended portions projecting outwardly from the annular portion. In one aspect, the axle system further includes a second anchoring sleeve assembly whereby the anchoring sleeve assembly and second anchoring sleeve assembly are both fixed to the axle tube housing.

Illustratively, in one aspect, a method is provided for securing a plurality of component systems to the axle tube housing. The method includes the step of positioning an anchoring sleeve assembly over the axle tube housing. Securing elements are inserted through the plurality of fixation apertures of the anchoring sleeve assembly. A component system from a plurality of component systems is secured to a respective extended portion of the anchoring sleeve assembly. Other aspects, advantages, and novel features of the present invention will become apparent from the detailed description of the present invention when considered in conjunction with the accompanying drawings.

DESCRIPTION OF THE DRAWINGS

The present invention is illustrated by way of example and not by limitation in the accompanying figures, in which like references indicate similar elements, and in which.

Skilled artisans appreciate that elements in the Figures are illustrated for simplicity and clarity and have not necessarily been drawn to scale. For example, the dimensions of some of the elements in the Figures may be exaggerated relative to the other elements to help improve understanding of the embodiments of the present invention.

DESCRIPTION

For a more complete understanding of the present invention, preferred embodiments of the present invention are illustrated in the Figures. Like numerals being used to refer to like and corresponding parts of the various accompanying drawings. It is to be understood that the disclosed embodiments are merely exemplary of the invention, which may be embodied in various forms.

Figure 1:
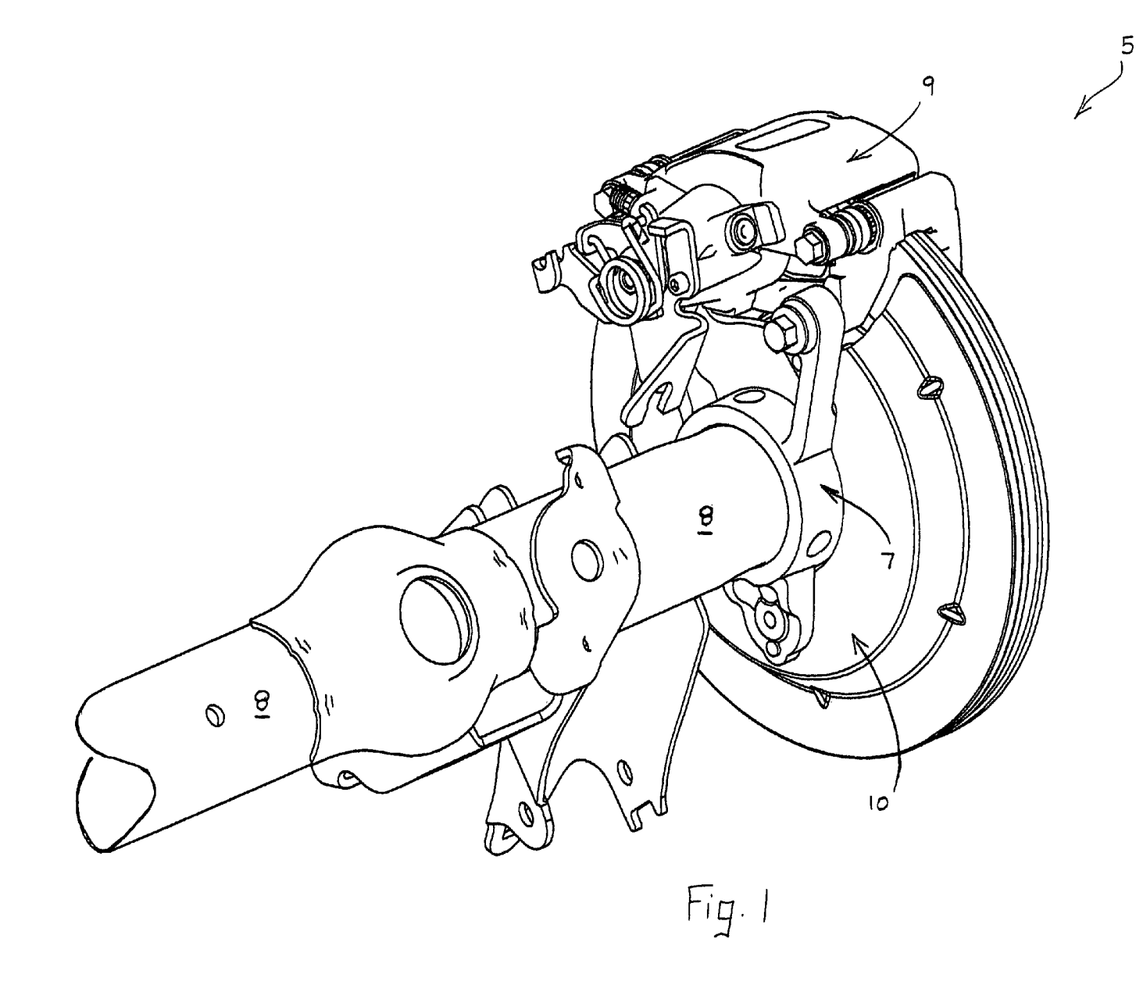
FIG. 1 is an isometric view illustrating an axle system according to the present invention, the axle system featuring an anchoring sleeve assembly coupled to an axle tube housing.

FIG. 1 illustrates one aspect, among others, of an axle system 5 for securing a plurality of component systems. Generally, an axle system features an anchoring sleeve assembly that is pre-machined prior to installation on an axle tube housing to minimize or eliminate the need for further machining operations once installed on the axle tube housing. Moreover, an anchoring sleeve assembly facilitates correct alignment of component systems with respect to the axle centerline.

In this disclosure and appended claims, the term "component system" refers to an apparatus or combination of apparatuses for ultimately providing a distinct operation associated with a motor vehicle requiring an axle and axle tube housing. For example, a component system may include, among others, an electrical system such as, among others, electrical wiring; a brake system such as, among others, brake calipers, brake lines, parking brake cable; a sensor system such as, among others, ABS sensors; a suspension system such as, among others, a leaf spring assembly, a coil spring assembly, shocks and struts, stabilizer bars, track bars, and springs. In this disclosure and appended claims, the term "pre-machining" refers to conditioning the sleeve bore to desired dimensioning and tolerancing required for coupling to the axle tube housing. For example, pre-machining may include machining processes of a type well known in the industry such as, among others, use of machine tools for the desired dimensioning and tolerancing, chemical etching, machine tools including lasers, and rapid tooling techniques, laser powder forming, selective laser sintering, sprayed metal deposition techniques, and three dimensional printing techniques.

Specifically, as viewed from the side, FIG. 1 illustrates on aspect, among others, of the axle system 5. The axle system 5 includes an anchoring sleeve assembly 7 coupled to an axle tube housing 8. Those of ordinary skill in the art will readily recognize that an axle tube housing 8 may be of a type well known to those in the industry.

In general, the anchoring sleeve assembly 7 features a plurality of outwardly projecting extended portions for receiving a respective component system. In operation, the anchoring sleeve assembly 7 fixedly receives a component system 9 to ultimately secure the component system 9 to the axle tube housing 8. In one exemplary embodiment, the component system 9 comprises a brake assembly. In one exemplary embodiment, as shown in FIG. 1, another extended portion of the anchoring sleeve assembly 7 is provided to secure and align an ABS sensor with respect to the axle tube housing 8, a backing plate arrangement 10, and, ultimately, the axle centerline.

In one exemplary embodiment, the anchoring sleeve assembly 7 is pre-machined to facilitate quick, easy alignment with the centerline defined by an axle within the axle tube housing 8. The anchoring sleeve assembly 7 is then secured in a desired position on the axle tube housing 8 so as to subsequently receive a component system thereon and, thus, ultimately align the fixed component system with the axle centerline. In one exemplary embodiment, the anchoring sleeve assembly 7 secures and aligns a plurality of component systems with the centerline.

Figure 2:
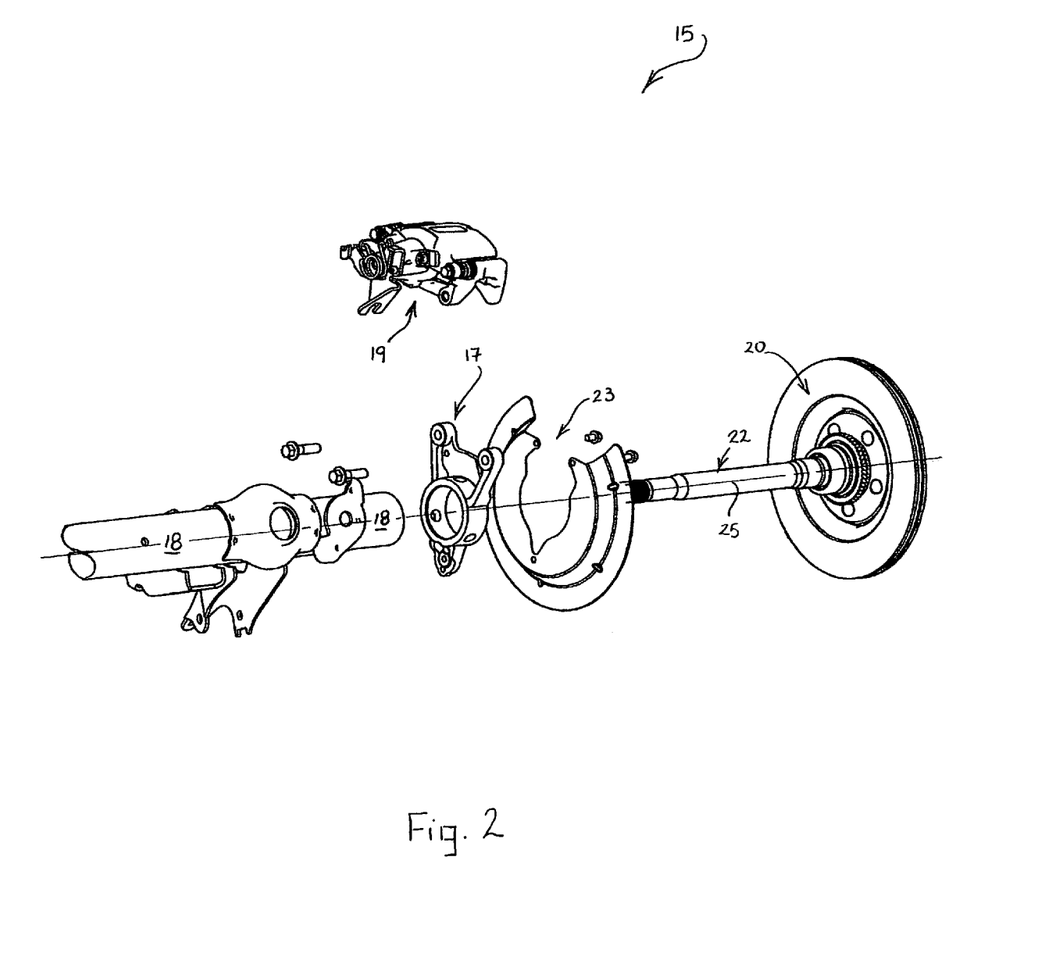
FIG. 2 is an exploded view illustrating an axle system, the axle system featuring an anchoring sleeve assembly for receiving a component system and, ultimately, securing the component system to an axle tube housing.

FIG. 2 is an exploded view illustrating one aspect, among others, of an axle system 15. The axle system 15 includes an axle tube housing 18 for receiving an axle shaft 22 therein. As shown in FIG. 2, the axle shaft 22 is coupled to a brake rotor unit 20.

The axle system 15 includes an anchoring sleeve assembly 17. The anchoring sleeve assembly 17 receives a component system and secures the component system to an axle tube housing 18 and indirectly to the axle shaft 22, respectively. As such, the anchoring sleeve assembly 17 ultimately aligns a component system with the axle shaft 22. In one exemplary embodiment, the anchoring sleeve assembly 17 receives a plurality of component systems for attachment to and alignment with the axle tube housing 18 and the axle shaft 22, respectively.

Illustratively, in one exemplary embodiment, the component system comprises a brake assembly 19 for operative engagement with the brake rotor unit 20. In one exemplary embodiment, the component system comprises an ABS sensor. Further referring to FIG. 2, in one exemplary embodiment, the component system comprises a backing plate unit 23.

In FIG. 2, the axle shaft 22 defines an axle centerline 25. Typically, in this application and appended claims, the axle centerline 25 is used as an absolute reference for positioning a component system with respect to the axle tube housing 18 via the anchoring sleeve assembly 17.

Figure 3:
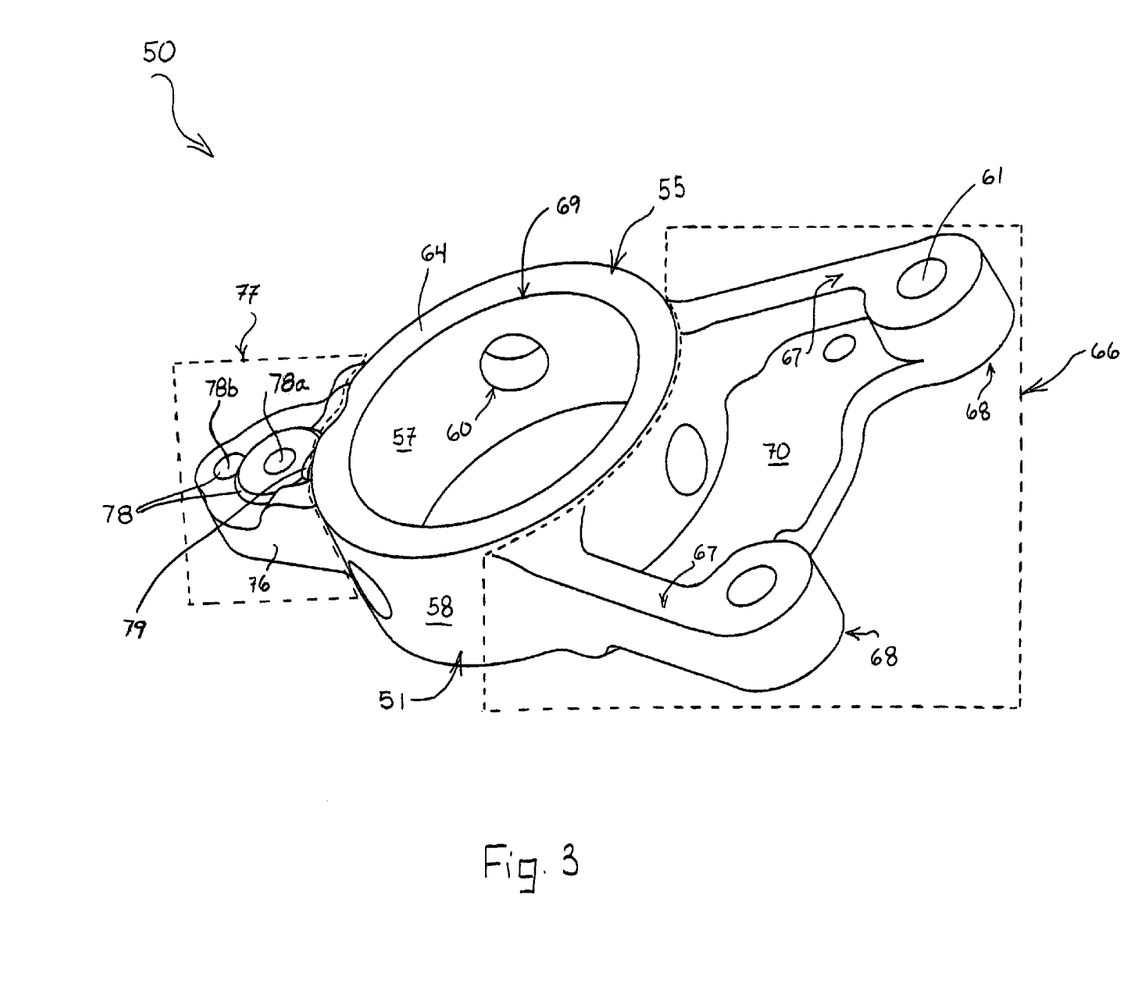
FIG. 3 is an isometric view illustrating an anchoring sleeve assembly for fixed engagement with an axle tube housing, the anchoring sleeve assembly defining a plurality of extended portions for receiving respective component systems.

FIG. 3 illustrates one aspect, among others, of an anchoring sleeve assembly 50. Generally, to minimize or eliminate further labor-intensive, machining operations, the anchoring sleeve assembly 50 is pre-machined prior to attachment to an axle tube housing. The anchoring sleeve assembly 50 provides a quick, simple method for securing and aligning component systems with respect to the axle centerline.

In particular, the anchoring sleeve assembly 50 includes an annular portion 55 and a plurality of extended portions projecting outwardly from the annular portion 55. The annular portion 55, in one exemplary embodiment, features an outer sleeve surface 58 and an inner sleeve surface 57. As shown in FIG. 3, the inner sleeve surface 57 defines a sleeve bore 69 for engagement with an axle tube housing (not shown). Generally, the sleeve bore 69 is pre-machined to optimally permit the anchoring sleeve assembly 50 to fit over the axle tube housing. To ensure that the anchoring sleeve assembly 50 is quickly and easily aligned with the axle centerline (not shown) and the axle tube housing, the sleeve bore 69 is subjected to machining operations of a type well known in the industry prior to engagement with the axle tube housing.

In one exemplary embodiment, the sleeve bore 69 is pre-machined to optimally permit the anchoring sleeve assembly 50 to fit over the axle tube housing with a slight clearance to an interference fit. In one exemplary embodiment, the interference fit is created at room temperature. In one exemplary embodiment, the interference fit is created by a shrink fit process of a type well known in the industry.

In one exemplary embodiment, a sleeve body 51 defines the annular portion 55. The sleeve body 51 of FIG. 3 features a sleeve thickness 64. Accordingly, the sleeve bore 69 is formed along the inner diameter of the sleeve thickness 64. The sleeve bore 69 is thus pre-machined so that the sleeve thickness 64 is ultimately reduced to accommodate the outer diameter provided by the axle tube housing. Optionally, in one exemplary embodiment, the sleeve body 51 may be formed of two concentric cylinders defining the sleeve thickness 64. In operation, the innermost concentric cylinder that includes the sleeve bore 69 may be configured to be releasable from the annular portion 55. Operatively, a series of interchangeable inner cylinders defining a sleeve bore may be substituted for one another to accommodate variations in size as required by the axle tube housing. Those of ordinary skill in the art will recognize a suitable manner for releasably coupling inner cylinders such as, among others, threadedly coupling an inner cylinder with an adjacent concentric cylindrical portion.

Optionally, to save on material defining the sleeve body 51, the annular portion 55 forms a groove portion (not shown). Specifically, a groove portion may be formed along the length of the sleeve body 51 and pass through the sleeve thickness 64. Alternatively, to save material, an annular grove may be formed radially about the sleeve thickness 64. In one exemplary embodiment, the sleeve bore 69 features a changing diameter along the length of the sleeve bore 69 to closely accommodate respectively changing outer diameter size of the axle tube housing.

The annular portion 55 defines the sleeve bore 69 and a plurality of fixation apertures 60 disposed about the annular portion 55. The plurality of fixation apertures 60 communicate with the sleeve bore 69. In this disclosure and appended claims the terms "communicate" or "in communication" refers to forming a continuous passageway. Accordingly, a securing element (not shown) is inserted through a respective fixation aperture from the plurality of fixation apertures 60 and the sleeve bore 69 so as to operatively contact the axle tube housing. Those of ordinary skill in the art will readily recognize that one or a combination of fixation apertures may assume a variety of shapes to accommodate a respective securing element. For example, among others, the shape of at least one fixation aperture may be circular, elliptical, cylindrical or may linearly extend the length of the annular portion 55 to form a groove.

In operation, a securing element (not shown) is disposed within the fixation aperture 60 to secure the anchoring sleeve assembly 50 to the axle tube housing. Optionally, in one exemplary embodiment, the securing element partially secures the anchoring sleeve assembly 50 whereas the pre-machined sleeve bore 69 also acts to secure the anchoring sleeve assembly 50 to the axle tube housing. In one exemplary embodiment, the securing element comprises a fastener of a type well known in the industry such as, among others, rivets, bolts, and press fitted pins. In one exemplary embodiment, the securing element comprises a weld of a type well known in the industry such as, among others, a plug weld, filet weld, and inertia weld. In one exemplary embodiment, the securing element may comprise adhesive bonding of a type well known in the industry.

Optionally, as shown in greater detail below in FIGS. 6, 11, and 12, the axle tube housing may define a fixation aperture throughway. In one exemplary embodiment, the axle tube housing defines a plurality of fixation aperture throughways. Each fixation aperture throughway communicates with a respective fixation aperture of the plurality of fixation apertures 60. In operation, a securing element is disposed within both the fixation aperture 60 and the respective fixation aperture throughway. Specifically, to ultimately secure the anchoring sleeve assembly to the axle tube housing, securing elements are inserted along both a fixation aperture provided by the annular portion and the fixation aperture throughway provided by the axle tube housing and in communication with the fixation aperture. Optionally, adhesive may be applied about the sleeve bore 69 to further enhance fixation of the anchoring sleeve assembly 50.

Generally, the anchoring sleeve assembly 50 further includes a plurality of extended portions projecting outwardly from the annular portion 55. Each extended portion from the plurality of extended portions fixedly receives a respective component system from the plurality of component systems to ultimately secure the component system to the axle tube housing. In one exemplary embodiment, at least one extended portion from the plurality of extended portions is releasable from the annular portion 55.

In one exemplary embodiment, as shown in FIG. 3, the anchoring sleeve assembly 50 includes a first extended portion 66 and a second extended portion 77. In operation, each extended portion receives a respective component system to ultimately secure and align the respective component system to the axle tube housing. Operatively, in one exemplary embodiment, the first extended portion 66 receives a respective component system such as, among others, a brake assembly. In one exemplary embodiment, the second extended portion 77 receives a respective component system such as, among others, an ABS sensor.

In one exemplary embodiment, a supply cable is disposed on an extended portion. The supply cable operatively provides either a voltage or a fluid to a respective component system.

Specifically referring to FIG. 3, the first extended portion 66 features a pair of support ribs 67 projecting outwardly from the sleeve body 51. The terminus of each support rib 67 forms a brake anchoring portion 68. Accordingly, as shown in FIG. 3, each brake anchoring portion 68 defines a brake assembly mount 61. In operation, each brake anchoring portion 68 fixedly receives a brake assembly at the respective brake assembly mount 61. In one exemplary embodiment, a brake assembly, secured to the first extended portion 66, includes, among other components, pads and calipers.

To enhance strength and rigidity, support webbing 70 extending outwardly from the sleeve body 51 is provided between each respective support rib 68. Optionally, as shown in FIG. 3, anchoring apertures may be defined by the support webbing 70 for securing additional component systems such as for example a backing plate assembly. Accordingly, each extended portion may optionally receive a plurality of component systems such as for example the first extended portion 66 of FIG. 3 as receiving both a backing plate assembly and a brake assembly.

The second extended portion 77 includes a flange body 76 extending outwardly from the sleeve body 51. In one exemplary embodiment, the flange body 76 defines a sensor receiving bore 79. In one exemplary embodiment, a component system comprising an ABS sensor (not shown) is operatively disposed within the sensor receiving bore 79. Optionally, in one exemplary embodiment, the flange body 76 further defines anchoring apertures 78. In one exemplary embodiment, a series of anchoring apertures may be provided to any extended portion to permit a variety of component systems to be secured to the axle tube housing without the need for adding standard joining structures, such as, among others bolted joints.

In general, the anchoring sleeve assembly 50 may be configured to minimize or eliminate the need for adding standard joining structures. Illustratively, the second extended portion 77 includes an ABS sensor receiving boss 78a. As is typical in the industry, an ABS sensor is often provided with a fastening interface that secures the ABS sensor to a desired structure. Operatively, the fastening interface is inserted in the ABS sensor receiving boss 78a while the ABS sensor is disposed within the sensor receiving bore 79. In one exemplary embodiment, the ABS sensor receiving boss 78a is threaded for securedly receiving the fastening interface and, thus, ultimately coupling the ABS sensor to the anchoring sleeve assembly 50. In one exemplary embodiment, the ABS sensor receiving boss 78a is self-tapping for receiving the fastening interface.

The second extended portion 77 includes a backing plate anchoring aperture 78b. Thus, in addition to the ABS sensor component system, a second component system comprising a backing plate may be operatively secured to the second extended portion 77 via the backing plate anchoring aperture 78b.

Optionally, in one exemplary embodiment, one extended portion may be configured to be releasable from the annular portion 55. For purposes of illustration, the second extended portion 77 is configured to be releasable from the annular portion 55. Specifically, the flange body 76 is releasable from the sleeve body 51. For example, the flange body 76 may be coupled to the sleeve body 51 by a releasable rail and groove system or a snap fit system of a type well known in the industry. It should be said that those of ordinary skill in the art will readily recognize any suitable means for releasably securing an extended portion to the annular portion. Optionally, once an extended portion is released from an annular portion, the extended portion may be interchanged with another extended portion that may either perform the same function or configured to perform either a different function or plurality of functions than the initial extended portion.

Operatively, a method for securing a plurality of component systems to an axle tube housing is as follows. Initially, an anchoring sleeve assembly is positioned over an axle tube housing. In one exemplary embodiment, as the anchoring sleeve assembly is positioned over the axle tube housing with a slight clearance to an interference fit. In one exemplary embodiment, the anchoring sleeve assembly is fit over the axle tube housing with a shrink fit. In one exemplary embodiment, an additional anchoring sleeve assembly may be secured to the axle tube housing in the same manner as described for the above anchoring sleeve assembly 50. Those of ordinary skill in the art will readily recognize that any individual or combination of anchoring sleeve assemblies may be secured to the axle tube housing in any manner of a type well known in the industry.

The anchoring sleeve assembly includes an annular portion. The annular portion defines a sleeve bore and a plurality of fixation apertures disposed about the annular portion. The plurality of fixation apertures communicate with the sleeve bore. The anchoring sleeve assembly further includes a plurality of extended portions. The plurality of extended portions project outwardly from the annular portion. In one exemplary embodiment, as the anchoring sleeve assembly is positioned over the axle tube housing, the anchoring sleeve assembly is aligned with a centerline defined by the axle within the axle tube housing.

Upon achieving a desired position relative to the axle tube housing, securing elements are inserted through the plurality of fixation apertures to fix the anchoring sleeve assembly to the axle tube housing. Optionally, the securing element partially secures the anchoring sleeve assembly whereas the sleeve bore also secures the anchoring sleeve assembly to the axle tube housing. As the anchoring sleeve assembly is secured to the axle tube housing, the at least one component system is secured to a respective extended portion.

Prior to positioning the anchoring sleeve assembly over an axle tube housing, the sleeve bore is pre-machined to ensure desired dimensioning and tolerancing thereof. Optionally, securing elements may be inserted through the axle tube housing in addition to plurality of fixation apertures provided by the annular portion. Optionally, an extended portion may be released from the annular portion. One releasable extended portion may be interchanged for another that either performs the same function or performs at least one different function.

Figure 4:
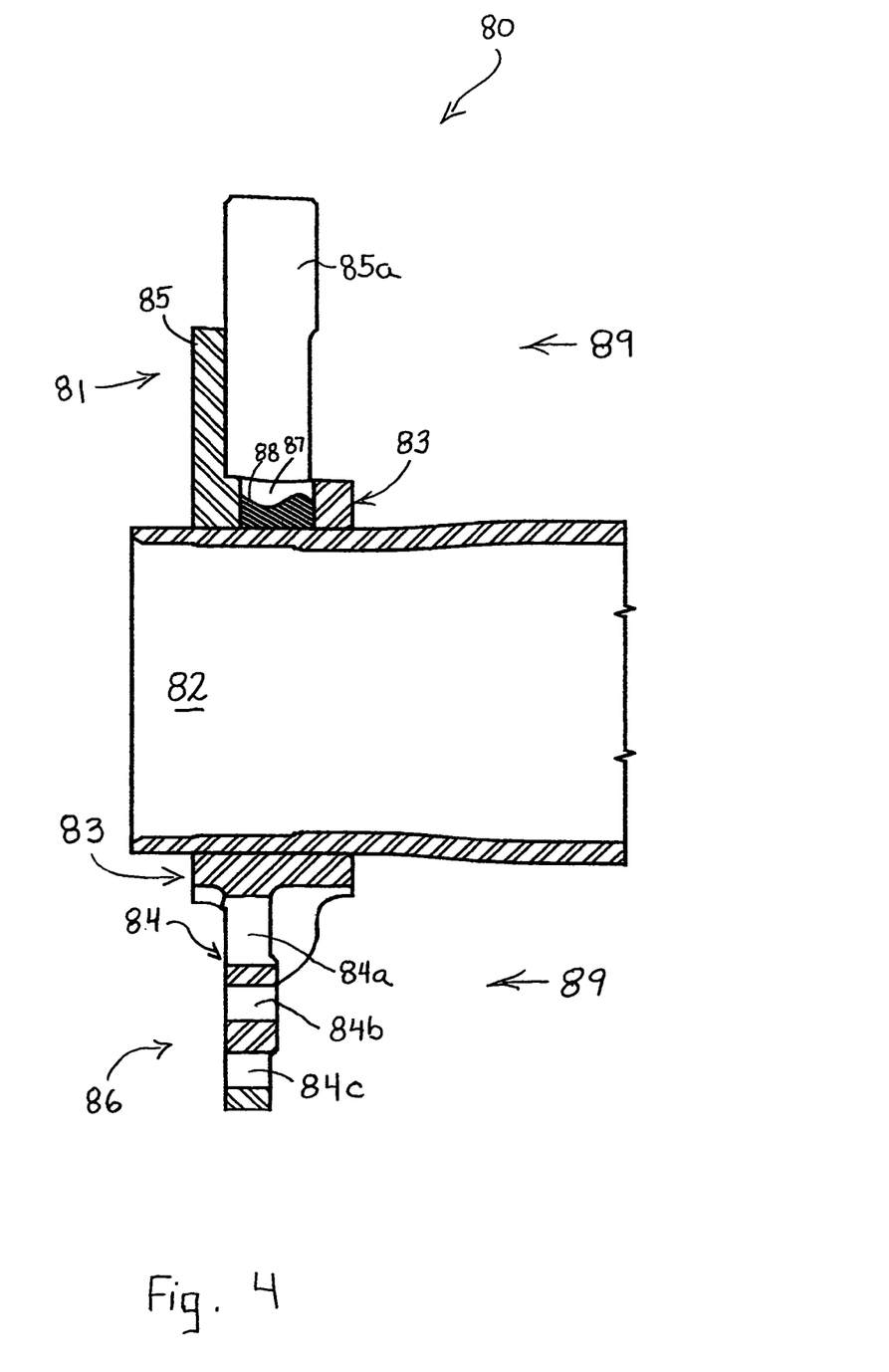
FIG. 4 is an orthographic view through the axle centerline illustrating an axle system, the axle system featuring an anchoring sleeve assembly for receiving a component system and, ultimately, securing the component system to an axle tube housing.

FIG. 4 is an orthographic view through the axle centerline illustrating one aspect, among others, of an axle system 80. The axle system 80 includes an anchoring sleeve assembly 89 coupled to an axle tube housing 82. In one exemplary embodiment, a plurality of anchoring sleeve assemblies are coupled to the axle tube housing 82.

Generally, as shown in FIG. 4, the anchoring sleeve assembly 89 includes a first extended portion 81, a second extended portion 86, and a plurality of fixation apertures 87. The anchoring sleeve assembly 89 includes an annular portion 83. The annular portion 83 defines the plurality of fixation apertures 87. A securing element 88 is inserted through the fixation aperture 87 to secure the anchoring sleeve assembly 89 to the axle tube housing 82. Alternatively, the securing element 88 may partially secure the anchoring sleeve assembly 89 to the axle tube housing 82. In one exemplary embodiment, the securing element 88 comprises a fillet weld for fixating the annular portion 83 to the axle tube housing 82.

The first extended portion 81 of FIG. 4 includes a brake support flange body 85 projecting outwardly from the annular portion 83. In one exemplary embodiment, the brake support flange body 85 includes a brake anchoring portion 85a for receiving a component system. Illustratively, the component system comprises a brake assembly having calipers and pads.

The second extended portion 86 includes a sensor flange body 84 projecting outwardly from the annular portion 83. The sensor flange body 84 is configured to permit a variety of component systems to be secured to the axle tube housing without the need for adding standard joining structures. In one exemplary embodiment, the sensor flange body 84 defines an ABS sensor bore 84a for receiving an ABS sensor therein (not shown).

In one exemplary embodiment, the sensor flange body 84 defines anchoring apertures. In particular, the sensor flange body 84 defines an ABS sensor receiving boss 84b for ultimately securing an ABS sensor to the sensor flange body 84. According, the ABS sensor receiving boss 84b may be threaded for securing standard mounts that commonly accompany an ABS sensor to the flange body 84.

The sensor flange body 84 further defines a backing plate anchoring aperture 84c. Accordingly, in addition to the ABS sensor component system, a second component system comprising a backing plate may be operatively secured to the sensor flange body 84 via the backing plate anchoring aperture 84c.

Figure 5:
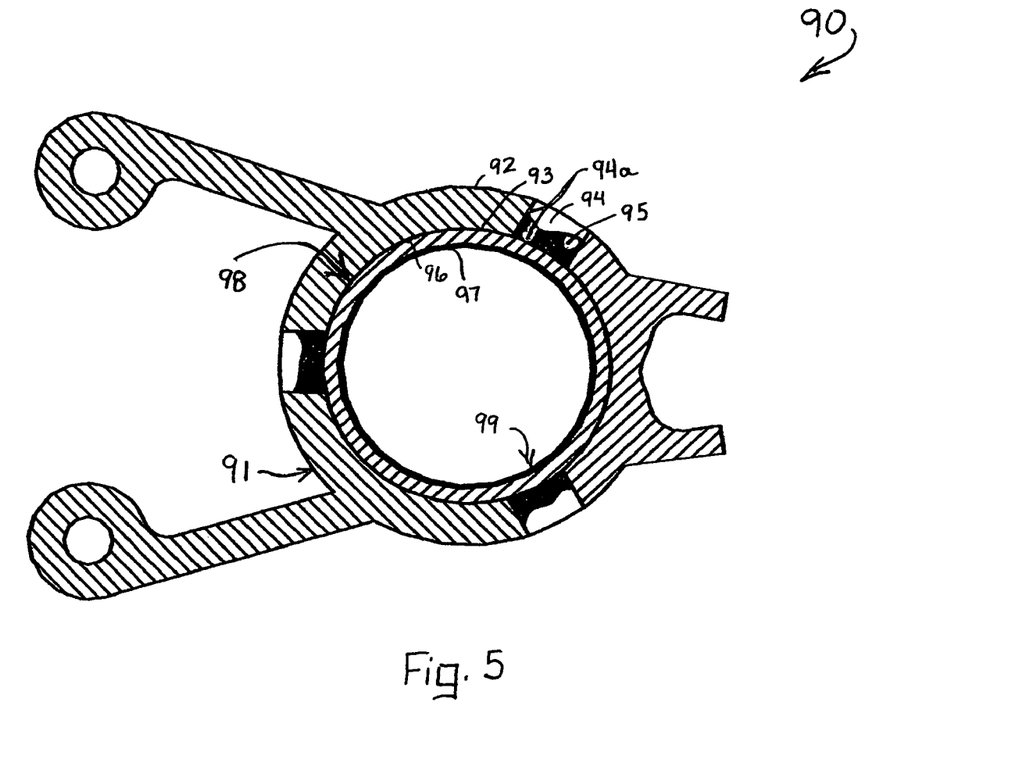
FIG. 5 is an orthographic view normal to the axle centerline illustrating an axle system, the axle system featuring an anchoring sleeve assembly coupled to an axle tube housing.

FIG. 5 illustrates one aspect, among others, of an axle system 90. The axle system 90 features an anchoring sleeve assembly 91 coupled to an axle tube housing 99. The axle tube housing 99 includes an outer tube surface 96 and an inner tube surface 97.

Similarly, the anchoring sleeve assembly 91 includes outer sleeve surface 92 and an inner sleeve surface 93 in contact with the outer tube surface 96 of the axle tube housing 99. The inner sleeve surface 93 defines a sleeve bore 98. The sleeve bore 98 is pre-machined to ensure optimal dimensioning and tolerancing for secured engagement with the outer tube surface 96.

An anchoring sleeve assembly 91 defines a plurality of fixation apertures 94. The anchoring sleeve assembly 91 receives securing elements 95 to facilitate fixation of the anchoring sleeve assembly 91 to the axle tube housing 99. Alternatively, each securing element 95 may partially secure the anchoring sleeve assembly 91 to the axle tube housing 99.

In one exemplary embodiment, the securing element 95 comprises a weld. Accordingly, the weld joins the anchoring sleeve assembly 91 to the outer tube surface 96 via a fusion zone 94a formed about the periphery of the securing element 95.

Figure 6:
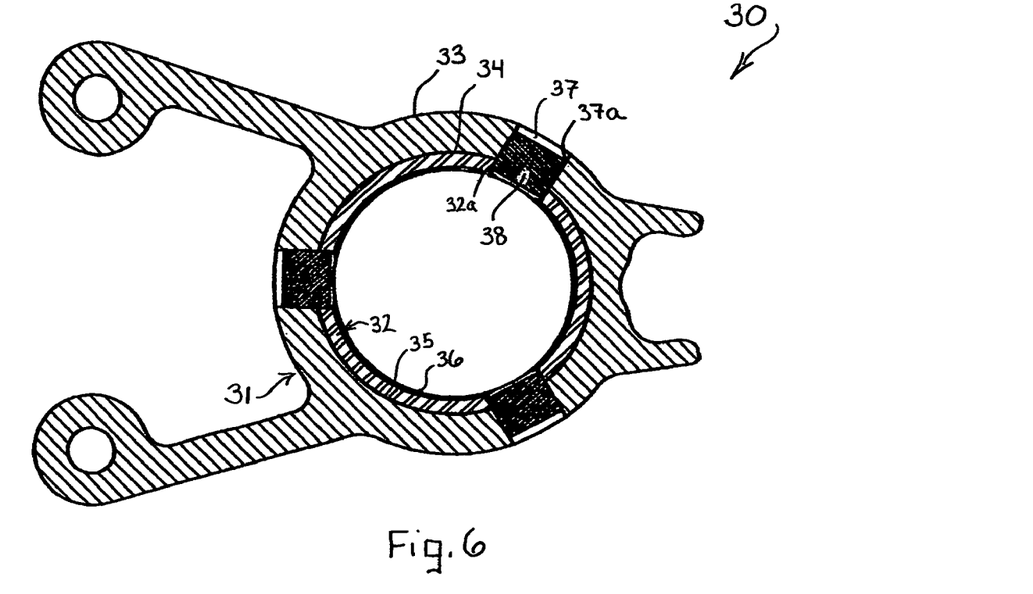
FIG. 6 is an orthographic view normal to the axle centerline illustrating an axle system, the axle system featuring an anchoring sleeve assembly coupled to an axle tube housing.

FIG. 6 illustrates one aspect, among others, of an axle system 30. The axle system 30 features an anchoring sleeve assembly 31 coupled to an axle tube housing 32. The anchoring sleeve assembly 32 includes an outer sleeve surface 33 and an inner sleeve surface 34. The axle tube housing 32 includes an inner tube surface 36 and an outer tube surface 35 in contact with the inner sleeve surface 34 of the anchoring sleeve assembly 32.

As shown in FIG. 6, the anchoring sleeve assembly 31 includes a fixation aperture 37 whereas the axle tube housing 32 includes a fixation aperture throughway 32a. Accordingly, each fixation aperture throughway 32a communicates with the respective fixation aperture 37 to form a continuous passageway. Operatively, a securing element 38 is disposed within the passageway collectively formed by the fixation aperture 37 and the respective fixation aperture throughway 32a. In one exemplary embodiment, the securing element 38 establishes an interference fitting along the fixation aperture 37 and fixation aperture throughway 32a to ultimately secure the anchoring sleeve assembly 31 to the axle tube housing 32. In effect, the anchoring sleeve assembly 31 receives securing elements 38 to facilitate fixation of the anchoring sleeve assembly 31 to the axle tube housing 32. Alternatively, each securing element 38 may partially secure the anchoring sleeve assembly 31 to the axle tube housing 32.

Figure 7:
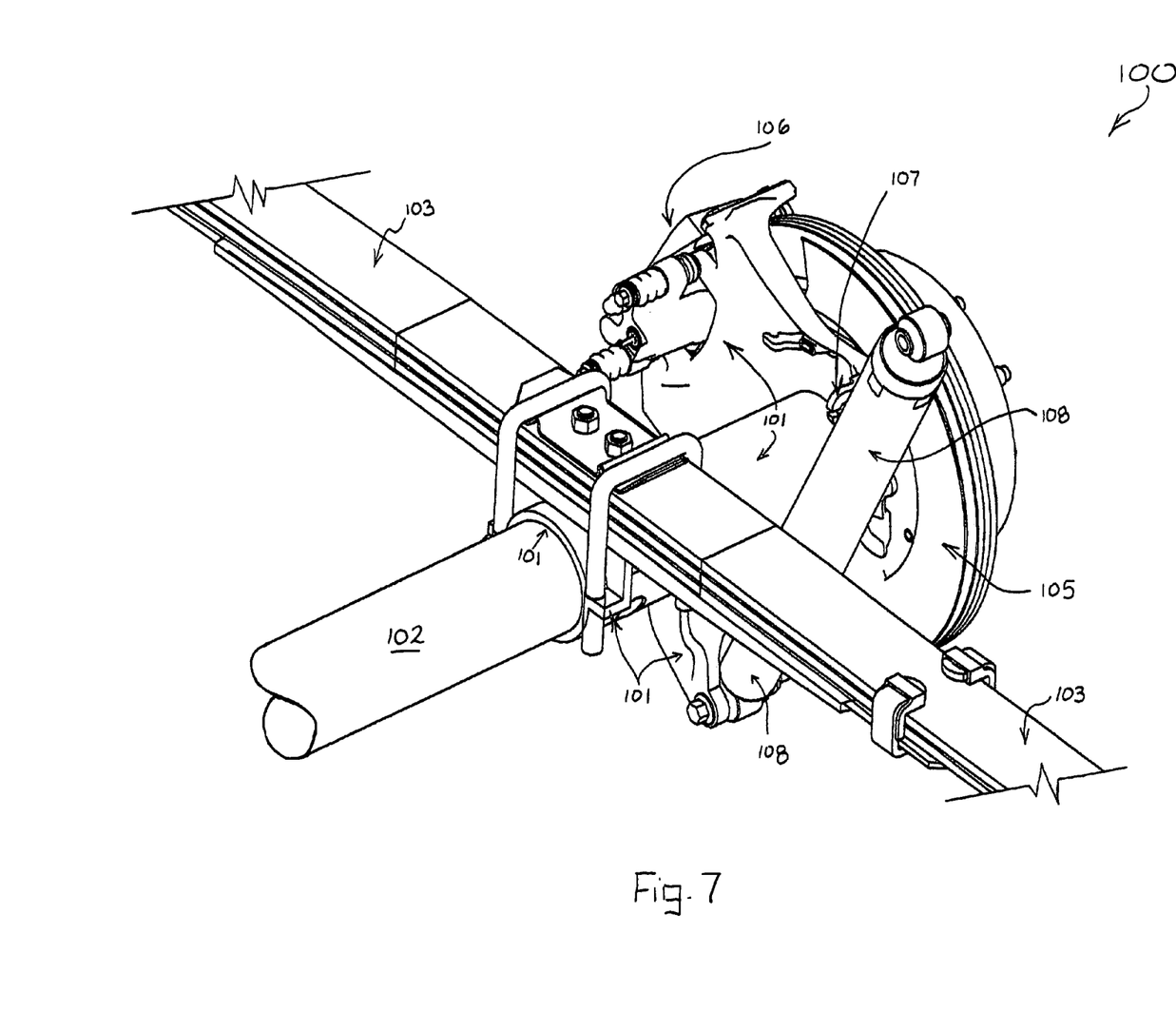
FIG. 7 is an isometric view illustrating one exemplary embodiment of an axle system, the axle system featuring an anchoring sleeve assembly coupled to an axle tube housing.

FIG. 7 illustrates one aspect, among others of an axle system 100. The axle system 100 includes an anchoring sleeve assembly 101. The anchoring sleeve assembly 101 is pre-machined to optimally fit over an axle tube housing 102. In one exemplary embodiment, the anchoring sleeve assembly 101 is pre-machined to fit over the axle tube housing 102 with a slight clearance to an interference fit.

Generally, the anchoring sleeve assembly 101 receives a plurality of component systems and, ultimately, secures the plurality of component systems to the axle tube housing 102. In one exemplary embodiment, the anchoring sleeve assembly 101 aligns the plurality of component systems with the axle tube housing 102. Those of ordinary skill in the art will readily recognize a plurality of component systems of a type well known in the industry for coupling to the anchoring sleeve assembly 101 and, ultimately, to the axle tube housing 102.

Illustratively, as shown in FIG. 7, a first component system 103 is coupled to the axle tube housing 102. In one exemplary embodiment, the first component system 103 comprises a leaf spring assembly. A second component system 106 of FIG. 7 is coupled to the axle tube housing 102. In one exemplary embodiment, the second component system 106 comprises a brake assembly. A third component system 108 is coupled to the axle tube housing 102. In one exemplary embodiment, the third component system 108 comprises a suspension dampener. A fourth component system 105 in FIG. 7 is coupled to the axle tube housing 102. In one exemplary embodiment, the fourth component system 105 comprises a backing plate arrangement. Optionally, a fifth component system may be coupled to the axle tube housing 102 via a boss 107 provided by the anchoring sleeve assembly 101. In one exemplary embodiment, the fifth component system may comprise a parking brake cable for receipt by the boss 107.

Figure 8:
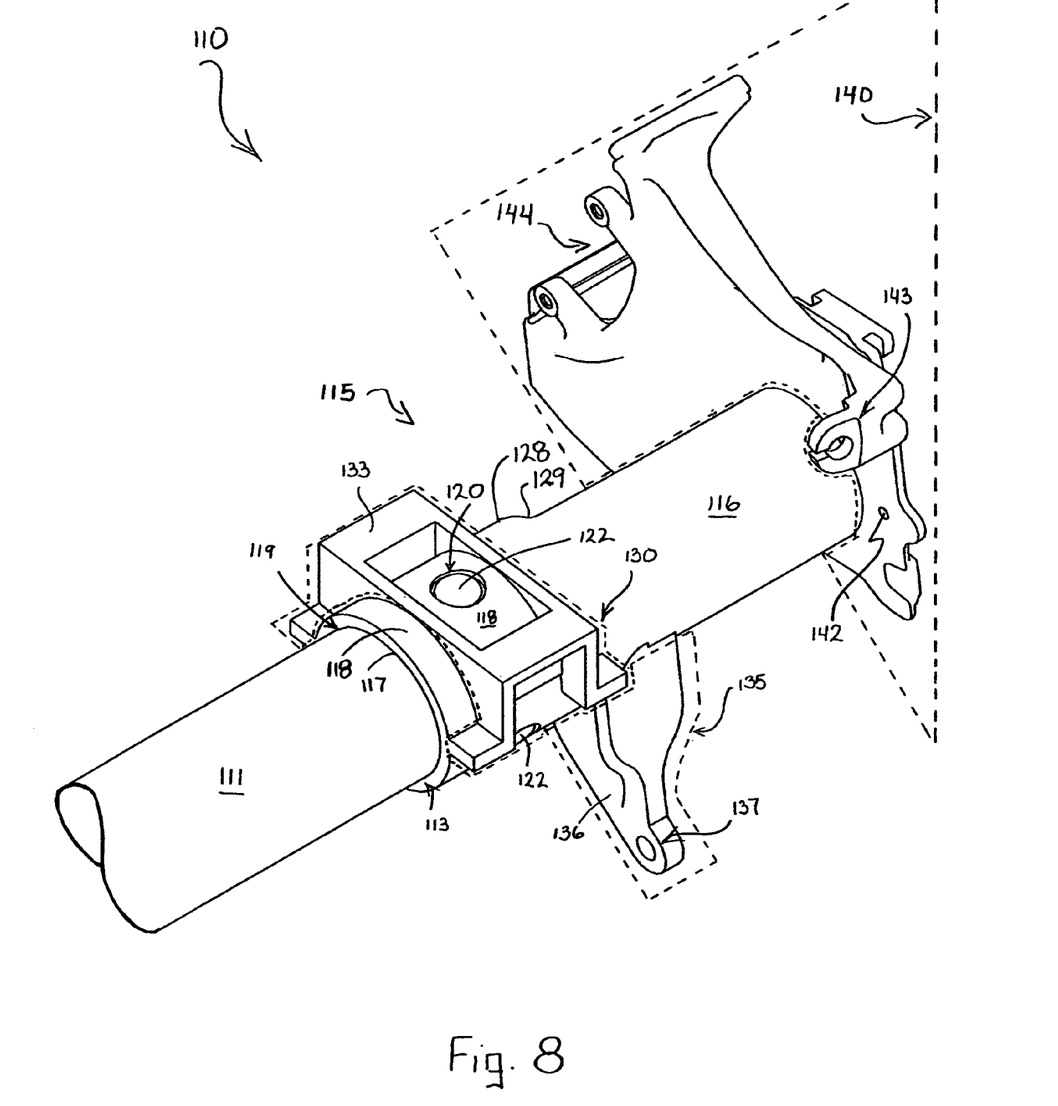
FIG. 8 is an isometric view illustrating one exemplary embodiment of an axle system, the axle system featuring an anchoring sleeve assembly coupled to an axle tube housing.

FIG. 8 illustrates one aspect, among others, of an axle system 110. The axle system 110 includes an axle tube housing 111 and an anchoring sleeve assembly 115 coupled to the axle tube housing 111. In one exemplary embodiment, the axle system 110 includes a plurality of anchoring sleeve assemblies coupled to the axle tube housing 111.

The anchoring sleeve assembly 115 includes an annular portion 113 having an outer sleeve surface 118 and an inner sleeve surface 117. The inner sleeve surface 117 defines a sleeve bore 119 for engagement with the axle tube housing 111. In one exemplary embodiment, the sleeve bore 119 is pre-machined to optimally permit the anchoring sleeve assembly 115 to fit over the axle tube housing 111. In one exemplary embodiment, the sleeve bore 119 features a continuously changing diameter along the inner sleeve surface 117.

In one exemplary embodiment, the annular portion 113 is composed of a plurality of concentric, cylindrical portions that enable the sleeve bore 119 to be releasable from the annular portion 113. Those of ordinary skill in the art will recognize a suitable manner for releasably coupling these concentric, cylindrical portions such as, among others, threadedly coupling the cylindrical portions. Accordingly, sleeve bores of varying dimensioning and tolerancing may be interchanged by replacing one cylindrical portion for another so as to ultimately accommodate coupling with axle tube housings of various sizes.

In one exemplary embodiment, the sleeve bore 119 is pre-machined to optimally permit the anchoring sleeve assembly 115 to fit over the axle tube housing 111 with a slight clearance to an interference fit. In one exemplary embodiment, the interference fit is created at room temperature. In one exemplary embodiment, the interference fit is created by a shrink fit process of a type well known in the industry. In one exemplary embodiment, adhesive may be applied to the sleeve bore to enhance fixation with the axle tube housing 111.

As shown in FIG. 8, the annular portion 113 defines a plurality of fixation apertures 120. The plurality of fixation apertures 120 are disposed about the annular portion 113. The plurality of fixation apertures 120 communicate with the sleeve bore 119. In operation, a securing element 122 is disposed within each aperture of the plurality of fixation apertures 120 to secure the anchoring sleeve assembly 115 to the axle tube housing 111. Alternatively, each securing element 122 is disposed within a respective fixation aperture of the plurality of fixation apertures 120 to partially secure the anchoring sleeve assembly 115 to the axle tube housing 111.

Those of ordinary skill in the art will readily recognize that a fixation aperture may exhibit a variety of shapes to ultimately accommodate a respective securing element. In one exemplary embodiment, a fixation aperture of the plurality of fixation apertures 120 extends substantially the entire length of the annular portion 113.

In one exemplary embodiment, the securing element 122 comprises a fastener of a type well known in the industry such as, among others, rivets, bolts, and press fitted pins. In one exemplary embodiment, the securing element 122 comprises a weld of a type well known in the industry such as, among others, a plug weld, fillet weld, and inertia weld. In one exemplary embodiment, the securing element 122 comprises adhesive bonding of a type well known in the industry.

The anchoring sleeve assembly 115 further includes a plurality of extended portions projecting outwardly from the annular portion 113. Alternatively, in one exemplary embodiment, the anchoring sleeve assembly 115 includes one extended portion projecting outwardly from the annular portion 113.

Generally, the anchoring sleeve assembly 115 receives a plurality of component systems and, ultimately, secures the plurality of component system to the axle tube housing 111 via a respective extended portion. Moreover, the anchoring sleeve assembly 115 receives the plurality of component systems and aligns the plurality of component systems relative to the centerline defined by the axle within the axle tube housing 111. In one exemplary embodiment, each extended portion may receive a plurality of component systems thereon.

For the embodiment of FIG. 8, the annular portion 113 is defined by a sleeve body 116. Accordingly, a plurality of extended portions project outwardly from the sleeve body 116. In one exemplary embodiment, the sleeve body 116 is composed of a rigid material such as, among others, steel, aluminum, ductile iron, and magnesium.

In one exemplary embodiment, the sleeve body 116 is divided in an axle tube sleeve portion 128 and a sleeve body extended portion 129. As shown in FIG. 8, the axle tube sleeve portion 128 is secured directly to the axle tube housing 111. At the terminus of the axle tube housing 111, the sleeve body extended portion 129 projects outwardly from the axle tube sleeve portion 128 to ultimately increase the surface area of the annular portion 113 to accommodate a greater number of extended portions projecting therefrom. The sleeve body extended portion 129 extends outwardly from the axle tube sleeve portion 128 and apart from direct contact with the axle tube housing 111. The sleeve body extended portion 129 for the embodiment of FIG. 8 features a smaller diameter than the axle sleeve portion to reduce overall material required by the sleeve body 116.

In one exemplary embodiment, the sleeve bore 119 features a continuously changing diameter along the geometric length of the annular portion 113. In one exemplary embodiment, the annular portion 113 is composed of a plurality of concentric, cylindrical portions that enable the sleeve bore 119 to be releasable from the annular portion 113. Accordingly, sleeve bores of varying dimensioning and tolerancing may be interchanged by replacing one cylindrical portion for another to ultimately accommodate various sizes of axle tube housings.

In one exemplary embodiment, as shown in FIG. 8, the anchoring sleeve assembly 115 includes a first extended portion 130, a second extended portion 135, and a third extended portion 140. In operation, each extended portion receives a respective component system to ultimately secure the respective component system to the axle tube housing 111. Moreover, each extended portion in one exemplary embodiment receives a respective component system to align the respective component system with the axle tube housing 111.

Those of ordinary skill in the art will readily recognize a variety of component systems of a type well known in the industry suitable for coupling to the axle tube housing 111. Those of ordinary skill in the art will readily recognize suitable component systems for attachment and, optionally, alignment to the axle tube housing 111 via the anchoring sleeve assembly 115. Moreover, those of ordinary skill will readily recognize that each extended portion may accommodate a plurality of component systems thereon.

In one exemplary embodiment, the first extended portion 130 receives a respective component system such as, among others, a leaf spring assembly. Specifically, the first extended portion 130 includes a spring seat platform support 133 for providing a stable foundation for the leaf spring. Moreover, in one exemplary embodiment, the first extended portion 130 may include a series of flanges for accommodating fasteners for securing the leaf spring to the first extended portion 130. Illustratively, among others, the fasteners comprise a pair of U-bolts.

In one exemplary embodiment, the second extended portion 135 receives a respective component system such as, among others, a suspension damper. Specifically, the second extended portion 135 includes a support arm 136 projecting outwardly from the sleeve body 116 of the annular portion 113. The terminus of the support arm 136 defines a damper base mount 137. Accordingly, the suspension damper is secured to the second extended portion at the damper base mount 137. In one exemplary embodiment, the suspension dampener comprises a shock absorber.

In one exemplary embodiment, the third extended portion 140 receives a respective component system such as, among others, a brake assembly. Particularly, the third extended portion 140 features a brake assembly interface 144 for receiving the brake assembly that includes, among others, pads, calipers, and rotors.

In one exemplary embodiment, the third extended portion 140 receives a plurality of component systems such as, among others, a brake assembly, a backing plate arrangement, and a cable. Specifically, the third extended portion 140 includes a support arm 143 for accommodating a cable. Illustratively, the support arm 143 may comprise a boss for supporting a parking brake cable attachment. The third extended portion 140 includes an anchoring aperture 142. Operatively, a backing plate arrangement is received by the third extended portion 140 by securing a fastener at the anchoring aperture 142.

Operatively, a plurality of component systems are secured to an axle tube housing 111 in the following manner. An anchoring sleeve assembly 110 is positioned over the axle tube housing 111. In one exemplary embodiment, the sleeve bore 119 of the anchoring sleeve assembly 115 is pre-machined to either minimize or eliminate further machining operations as the anchoring sleeve assembly 115 is positioned over the axle tube housing 111. In one exemplary embodiment, the anchoring sleeve assembly 110 fits over the axle tube housing 111 with a slight clearance to an interference fit. In one exemplary embodiment, the anchoring sleeve assembly 110 is secured over the axle tube housing with a shrink fit. In one exemplary embodiment, a plurality of anchoring sleeve assemblies may be positioned over the axle tube housing 111.

The anchoring sleeve assembly 115 is aligned with a centerline defined by the axle within the axle tube housing 111. In one exemplary embodiment, adhesive is applied to the sleeve bore 119 for contact with the axle tube housing 111.

Securing elements 122 are inserted though the plurality of fixation apertures 120 to secure the anchoring sleeve assembly 115 entirely to the axle tube housing 111. In one exemplary embodiment, the securing elements 122 are inserted through the plurality of fixation apertures 120 to partially secure the anchoring sleeve assembly 115 over the axle tube housing 111. In one exemplary embodiment, the securing elements 122 are inserted through the axle tube housing 111 in addition to the anchoring sleeve assembly 115.

Accordingly, in one exemplary embodiment, a component system is secured to a respective extended portion of an anchoring sleeve assembly. In one exemplary embodiment, a plurality of component systems are secured to a single respective extended portion. For the embodiment of FIG. 8, the size of the annular portion 113 may vary according to suitably accommodate the actual number of extended portions provided by the anchoring sleeve assembly.

Figure 9:
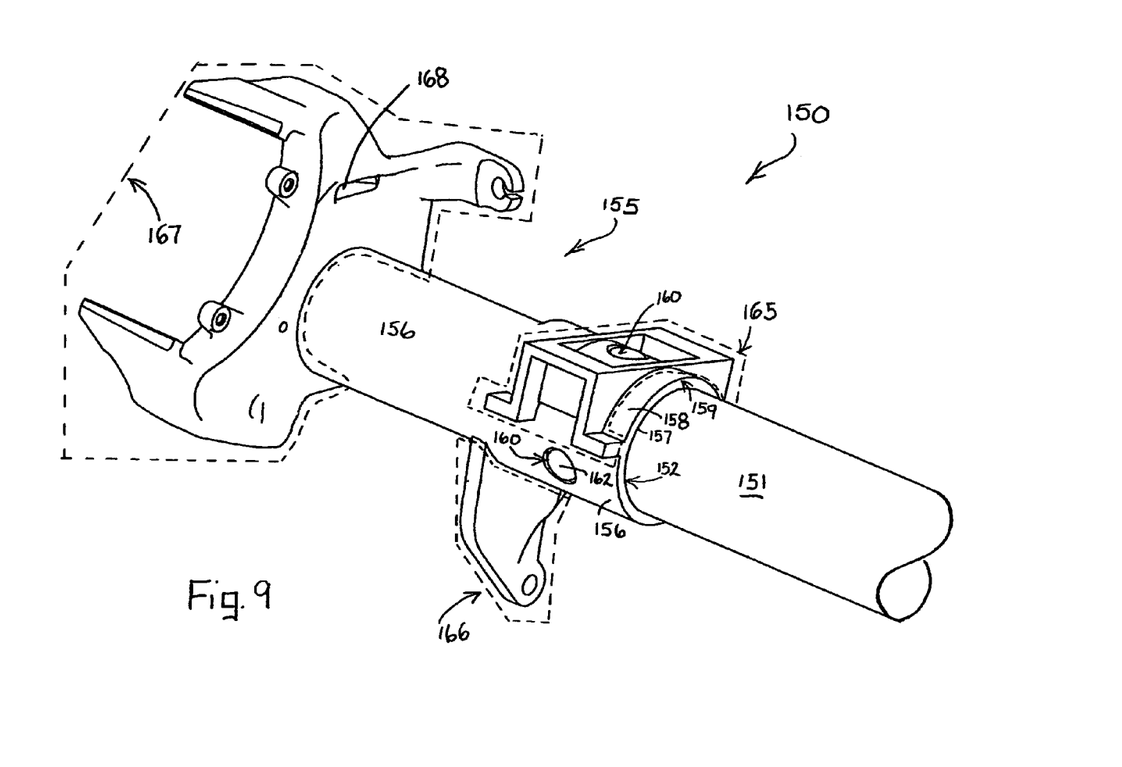
FIG. 9 is an isometric view illustrating one exemplary embodiment of an axle system, the axle system featuring an anchoring sleeve assembly coupled to an axle tube housing.

FIG. 9 illustrates one aspect, among others, of an axle system 150. The axle system 150 includes an anchoring sleeve assembly 155. The anchoring sleeve assembly 155 is coupled to an axle tube housing 151. The anchoring sleeve assembly 155 includes an annular portion 159. The annular portion 159 is defined by a sleeve body 156. In exemplary embodiment, the sleeve body 156 includes a sleeve body extended portion as described above for the embodiment of FIG. 8. In one exemplary embodiment, the sleeve body extended portion may include at least one groove to ultimately reduce the overall amount of material comprising the sleeve body 156.

The annular portion 159 features an outer sleeve surface 158 and an inner sleeve surface 157. The inner sleeve surface 157 defines a sleeve bore 152 for engagement with the axle tube housing 151. In one exemplary embodiment, the sleeve bore 152 is pre-machined to permit the anchoring sleeve assembly 155 to fit over the axle tube housing 151. In one exemplary embodiment, the sleeve bore 152 is pre-machined to optimally permit the anchoring sleeve assembly 155 to fit over the axle tube housing 151 with a slight clearance to an interference fit.

The anchoring sleeve assembly 155 further includes a plurality of extended portions projecting outwardly from the annular portion 159. In one exemplary embodiment, as shown in FIG. 9, the anchoring sleeve assembly 155 includes a first extended portion 165, a second extended portion 166, and a third extended portion 167. One exemplary embodiment of the third extended portion 167 includes a feeder window 168 for receiving a cable therethrough such as, among others, an electric cable for supplying a voltage.

The annular portion 159 defines a plurality of fixation apertures 160 in communication with the sleeve bore 152. The plurality of fixation apertures 160 are disposed about the annular portion 159. Operatively, each fixation aperture 160 receives a respective securing element 162 thereby securing the anchoring sleeve assembly 155 to the axle tube housing 151.

Figure 10:
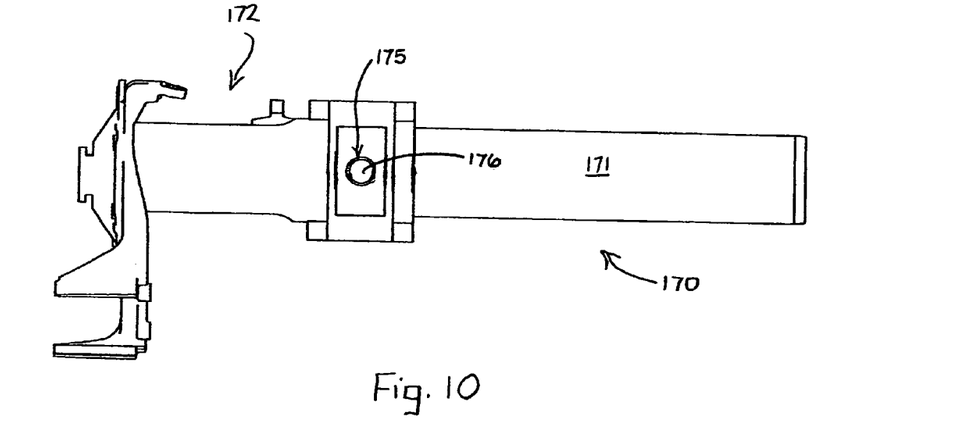
FIG. 10 is an orthographic view through the axle centerline illustrating one exemplary embodiment of an axle system, the axle system featuring an anchoring sleeve assembly coupled to an axle tube housing.

FIG. 10 illustrates one aspect, among others, of an axle system 170. The axle system 170 includes an anchoring sleeve assembly 172. The anchoring sleeve assembly 172 is coupled to an axle tube housing 171.

The anchoring sleeve assembly 172 defines a plurality of fixation apertures 175. In operation, a securing element 176 is disposed within each fixation aperture 175 to couple the anchoring sleeve assembly 172 to the axle tube housing 171. Alternatively, the securing element 176 may partially couple the anchoring sleeve assembly 172 to the axle tube housing 171.

Figure 11:
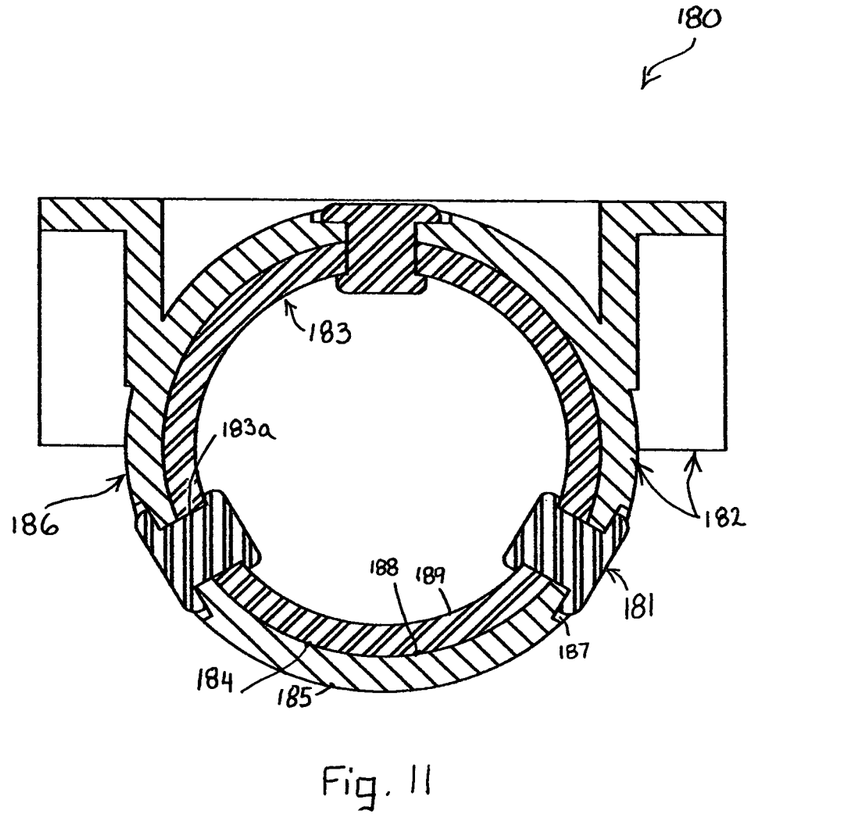
FIG. 11 is an orthographic view normal to the axle centerline illustrating one exemplary embodiment of an axle system, the axle system featuring an anchoring sleeve assembly coupled to an axle tube housing.

FIG. 11 illustrates one aspect, among others, of an axle system 180. As shown, the axle system 180 includes an anchoring sleeve assembly 182 coupled to an axle tube housing 183. The anchoring sleeve assembly 182 includes an annular portion 186.

The annular portion 186 features an outer sleeve surface 185 and an inner sleeve surface 186 in operative contact with the axle tube housing 183. Similarly, the axle tube housing 183 includes an inner tube surface 189 and an outer tube surface 188 in operative contact with the inner sleeve surface 184. The inner sleeve surface 184 defines a sleeve bore. In one exemplary embodiment, the sleeve bore is pre-machined to fit over the outer tube surface 188.

As shown in FIG. 11, the annular portion 186 defines a plurality of fixation apertures 187. Moreover, for the axle system 180 of FIG. 11, the axle tube housing 183 defines a plurality of fixation aperture throughways 183a each in communication with a respective fixation aperture 187. Generally, a securing element 181 is disposed within the plurality of fixation apertures 187 to couple the anchoring sleeve assembly 182 to the axle tube housing 183. In FIG. 11, the securing element 181 is disposed within both the fixation aperture 187 and the respective fixation aperture throughway 183a to enhance fixation to the axle tube housing 183. In one exemplary embodiment, the securing element 181 comprises a rivet.

Figure 12:
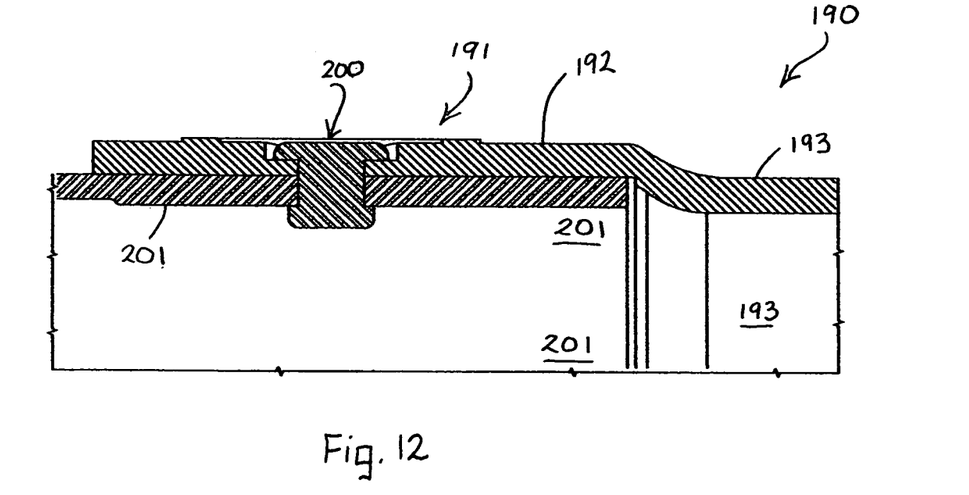
FIG. 12 is an orthographic view through the axle centerline illustrating one exemplary embodiment of an axle system, the axle system featuring an anchoring sleeve assembly coupled to an axle tube housing.

FIG. 12 is a cross-sectional view through an axle tube housing centerline illustrating one aspect, among others, of an axle system 190. In particular, FIG. 12 shows an anchoring sleeve assembly 191 secured to an axle tube housing 201 via a plurality of securing elements 200.

The anchoring sleeve assembly 191 features an axle tube sleeve portion 192 in direct contact with the axle tube housing 201 and a sleeve body extended portion 193 projecting outwardly from the axle tube sleeve portion 192. As shown, the sleeve body extended portion 193 is not in direct contact with the axle tube housing 201. The sleeve body extended portion 193 in one exemplary embodiment 193 features an inner diameter less than or equal to that of the axle tube housing to save on overall material composing the anchoring sleeve assembly 191. Accordingly, the effective diameter of the sleeve body extended portion 193 may be larger depending on structural or interference needs. It should be added that those of ordinary skill in the art will readily recognize that an extended portion may be configured within a wide variety of shapes in addition to a circular shape.

Although the present invention has been described in detail, it should be understood that various changes, substitutions, and alterations could be made hereto without departing from the spirit and scope of the invention as defined by the appended claims.

We claim:

1. An anchoring sleeve assembly for securing a plurality of component systems to an axle tube housing, the anchoring sleeve assembly comprising:
   an annular portion,
      the annular portion defining
         a plurality of fixation apertures about the annular portion and a sleeve bore,
         the plurality of fixation apertures in communication with the sleeve bore,
         the sleeve bore is pre-machined; and
   a plurality of extended portions projecting outwardly from the annular portion,
      each extended portion from the plurality of extended portions fixedly receiving a respective component system from the plurality of component systems to ultimately secure the respective component system to the axle tube housing.

2. The anchoring sleeve assembly according to claim 1 wherein the sleeve bore is pre-machined to optimally permit the anchoring sleeve assembly to fit over the axle tube housing with a slight clearance to an interference fit.

3. The anchoring sleeve assembly according to claim 1 wherein a securing element is disposed within a corresponding fixation aperture from the plurality of fixation apertures and wherein the securing element secures the anchoring sleeve assembly to the axle tube housing.

4. The anchoring sleeve assembly according to claim 1 wherein an extended portion from the plurality of extended portions is releasable from the annular portion.

5. The anchoring sleeve assembly according to claim 1 wherein the sleeve bore is releasable from the annular portion.

6. The anchoring sleeve assembly according to claim 1 further including a groove portion formed by the annular portion.

7. The anchoring sleeve assembly according to claim 1 wherein the sleeve bore features a continuously changing diameter along the annular portion.

8. The anchoring sleeve assembly according to claim 1 further including a supply cable disposed on an extended portion.

9. An axle system for securing a plurality of components, the axle system comprising
   an axle tube housing; and
   an anchoring sleeve assembly,
      the anchoring sleeve assembly including
         an annular portion,
            the annular portion defining
               a plurality of fixation apertures disposed about the annular portion and
               a sleeve bore,
               the plurality of fixation apertures in communication with the sleeve bore,
               the sleeve bore is pre-machined; and
         a plurality of extended portions projecting outwardly front the annular portion,
            each extended portion from the plurality of extended portions fixedly receiving a respective component system from the plurality of component systems.

10. The axle system according to claim 9 wherein the axle tube housing defining a plurality of fixation aperture throughways, each fixation aperture throughway in communication with a respective fixation aperture of the plurality of fixation apertures and wherein a securing element is disposed within the respective fixation aperture and the corresponding fixation aperture throughway.

* * * * *